United States Patent
Meyron et al.

(10) Patent No.: US 11,933,971 B2
(45) Date of Patent: Mar. 19, 2024

(54) PROCESS FOR CREATING AN OPTICAL COMPONENT FOR GENERATING, FROM A GIVEN LIGHT SOURCE, A GIVEN NEAR-FIELD ILLUMINATION

(71) Applicants: UNIVERSITÉ GRENOBLE ALPES, Saint Martin d'Heres (FR); GRENOBLE INP (INSTITUT POLYTECHNIQUE DE GRENOBLE), Grenoble (FR); CNRS (CENTRE NATIONAL DE LA RECHERCHE SCIENTIFIQUE), Paris (FR); UNIVERSITÉ PARIS-SUD 11, Orsay (FR)

(72) Inventors: Jocelyn Meyron, Saint-Martin-d'Hères (FR); Quentin Mérigot, Orsay (FR); Boris Thibert, Saint-Martin-d'Hères (FR)

(73) Assignees: UNIVERSITE GRENOBLE ALPES, Saint Martin d'Heres (FR); GRENOBLE INP (INSTITUT POLYTECHNIQUE DE GRENOBLE), Grenoble (FR); CNRS (CENTRE NATIONAL DE LA RECHERCHE SCIENTIFIQUE), Paris (FR); UNIVERSITÉ PARIS-SACLAY, Saint Aubin (FR)

( * ) Notice: Subject to any disclaimer, the term of this patent is extended or adjusted under 35 U.S.C. 154(b) by 259 days.

(21) Appl. No.: 17/296,116

(22) PCT Filed: Nov. 20, 2019

(86) PCT No.: PCT/IB2019/059969
§ 371 (c)(1),
(2) Date: May 21, 2021

(87) PCT Pub. No.: WO2020/104960
PCT Pub. Date: May 28, 2020

(65) Prior Publication Data
US 2022/0011569 A1 Jan. 13, 2022

(30) Foreign Application Priority Data

Nov. 22, 2018 (FR) .................................... 1871709

(51) Int. Cl.
G02B 27/00 (2006.01)
G02B 27/09 (2006.01)
G06F 17/11 (2006.01)

(52) U.S. Cl.
CPC ..... *G02B 27/0012* (2013.01); *G02B 27/0927* (2013.01); *G02B 27/095* (2013.01); *G02B 27/0977* (2013.01); *G06F 17/11* (2013.01)

(58) Field of Classification Search
CPC ............ G02B 27/0012; G02B 27/0927; G02B 27/095; G02B 27/0977; G06F 17/11
(Continued)

(56) References Cited

U.S. PATENT DOCUMENTS

2012/0065760 A1* 3/2012 Yagi .................... G02B 19/0028
362/326

FOREIGN PATENT DOCUMENTS

| EP | 2 711 745 A2 | 3/2014 |
| EP | 2 963 463 | 1/2016 |
| EP | 2 711 745 A3 | 11/2016 |

OTHER PUBLICATIONS

Bruno Levy, "A Numerical Algorithm for $L_2$ Semi-Discrete Optimal Transport in 3D", ESAIM: Mathematical Modelling and Numerical Analysis, M2AN 49, 2015, pp. 1693-1715 (23 pages).
(Continued)

*Primary Examiner* — Wyatt A Stoffa
*Assistant Examiner* — Mitchell T Oestreich
(74) *Attorney, Agent, or Firm* — NIXON & VANDERHYE (57) ABSTRACT

Disclosed is a method for fabricating an optical component that is configured so as to generate on an illumination target in the near-field an illumination that has a determined pattern according to which each point (i) of the illumination target receives a quantity of light (alpha i) via an illumination
(Continued)

generated by an illumination light source that is incident on the optical component, which is placed between the illuminating light source and the illumination target.

4 Claims, 2 Drawing Sheets

(58) Field of Classification Search
USPC .......................................................... 359/629
See application file for complete search history.

(56) References Cited

OTHER PUBLICATIONS

Quentin Mérigot, et al., "Light in Power: A General and Parameter-Free Algorithm for Caustic Design", ARXIV:1708.04820VI [CS.GR], Aug. 16, 2017, 26 pages.

Jocelyn Meyron, et al., "Semi-discrete optimal transport and applications in non-imaging optics", PhD thesis, Computer science, Université Grenoble Alpes, HAL Id: tel—02135220, submitted May 21, 2019, 139 pages.

Jocelyn Meyron, et al., "Geometric methods for the conception of optical components in non-imaging optics", Slides of presentation at the 19th Journee Graphes et Algorithmes (JGA 2017), LaBRI, Bordeaux, Dec. 15, 2017, 58 pages.

Jocelyn Meyron, et al., "Light in Power: A General and Parameter-free Algorithm for Caustic Design", ACM Trans. Graph, vol. 37, No. 6, Article 224, publication date: Nov. 2018, 13 pages.

Yuliy Schwartzburg, et al., "High-contrast Computational Caustic Design", ACM Transactions on Graphics, vol. 33, No. 4, Article 74, publication date: Jul. 2014, pp. 74:1-74:11 (11 pages).

Search Report for FR Application No. 1871709 dated Nov. 5, 2019, 11 pages.

International Search Report for PCT/IB2019/059969 dated May 28, 2020, 7 pages.

Written Opinion of the ISA for PCT/IB2019/059969 dated May 28, 2020, 8 pages.

* cited by examiner

PROCESS FOR CREATING AN OPTICAL COMPONENT FOR GENERATING, FROM A GIVEN LIGHT SOURCE, A GIVEN NEAR-FIELD ILLUMINATION

BACKGROUND OF THE INVENTION

Field of the Invention

The present invention relates to the creation of optical components, in particular the creation of an optical component in order to generate, from a given light source, a given illumination on a near field target (finite distance).

Description of the Related Art

The field of non-imaging optics (or anidolic optics, non-imaging optics being the English designation) deals with the design of optical components with the goal being to transfer the optical radiation emitted by a light source onto a prescribed target. This issue lies at the core of many applications for which it is desired to optimize the use of light energy by reducing light loss or light pollution. Such problems arise in particular but not exclusively in the design of vehicle headlight beams, public lighting, solar furnaces, or indeed even, for example, for hydroponic cultivation.

For a far-field target (at infinity), the creation of optical components (for example mirrors and lenses) that provide the ability to transport the light energy emitted by a light source to this far field target is a known technical approach: given a source of collimated light (like the sun) or point source (emitted by a point), and a desired far-field illumination target, the optical components created have the property of reflecting (in the case of mirrors) or of refracting (in the case of lenses) the light source on the illumination target (such as a black and white image). The published scientific paper "Light in power: A general and parameter free algorithm for caustic design", Quentin Mérigot, Jocelyn Meyron, Boris Thibert, version 1, 31/07/2017, arXiv:1708.04820, thus describes a method for creating an optical component in order to generate a given illumination from a given light source, on a far-field target.

There are also existing methods for creating optical components in order to generate a given illumination from a given light source, on a near field target. The published scientific paper "High contrast computational caustic design", Yuliy Schwartzburg, Romain Testuz, Andrea Tagliasacchi, Mark Pauly, ACM, Transactions on Graphics (TOG) 33, 4 (2014), 74, presents the construction of good quality lenses in the case of a collimated light source (that is to say parallel rays, like those of the sun) and a near field (at finite distance) target. The method used is based on heuristics and requires the adjustment of a plurality of parameters, which turns out to be complex in practice.

However, there currently exists no method that is simple, easy to configure or even parameter free, which provides the ability to create an optical component in order to generate on a near field (at a finite distance) target a given illumination from a given light source.

SUMMARY OF THE INVENTION

The present invention thus proposes to meet this need by providing a method based on the iterative solving of a series of far-field non-imaging (anidolic) optics problems.

The Applicant indeed found in a surprising manner that solving a series of far-field non-imaging optics problems converged to a solution of near-field non-imaging optics.

Therefore, an object of the present invention is a method for fabricating an optical component that is configured so as to generate on a near-field illumination target an illumination that has a determined pattern according to which each point (i) of the illumination target receives a quantity of light (alpha_i) via an illumination originating from an illumination light source which is incident on the optical component placed between the illumination light source and the illumination target, characterized in that the method includes the following steps:

(a) positioning an origin point between the illumination light source and the illumination target;

(b) for each point (i) of the illumination target, computing a direction (dir_i) which corresponds to the direction of the vector connecting the origin point and the point (i) on the illumination target;

(c) positioning a reference point between the origin point and the illumination target;

(d) creating the optical component whose surface passes by the reference point and which, when the illumination originating from the illumination light source is incident on the optical component, generates an illumination comprised of all the illuminations of direction (dir_i) and quantity of light (alpha_i);

(e) for each point (z_i) of the optical component that generates the illumination of direction (dir_i) and quantity of light (alpha_i), computing a corrected direction (dirc_i) which corresponds to the direction of the vector connecting the point (z_i) and the point (i) on the illumination target;

(f) determining whether or not, for each point (i), the difference between the direction (dir_i) and the corrected direction (dirc_i) satisfies a predetermined criterion;

(g) if, for each point (i), the difference between the direction (dir_i) and the corrected direction (dirc_i) satisfies the predetermined criterion, fabricating the optical component that corresponds to the optical component, (h) if, for each point (i), the difference between the direction (dir_i) and the corrected direction (dirc_i) does not satisfy the predetermined criterion, reiterating the steps (d) to (f) by substituting (dir_i) with (dirc_i).

The creation step (d) for creating an optical component pertains to the creation of an optical component for a far-field target. Any appropriate method may be used to create this optical component for a far field target. Preferably, but not exclusively, the method described in the published scientific paper "Light in power: A general and parameter free algorithm for caustic design" will be used, this method being described in greater detail in the section presenting the detailed description of the invention.

According to one embodiment, the predetermined criterion of the step (f) is that on each point (i) the mean of the norms of the differences between the direction (dir_i) and the corrected direction (dirc_i) is less than a predetermined value, for example but not exclusively less than $10^{-6}$, the difference being calculated by subtracting (dir_i)-(dirc_i).

More precisely, the calculation of this global criterion for N points is given by:

$$(\text{Norm}((dir\_1)-(dirc\_1))+\text{Norm}((dir\_2)-(dirc\_2))+\ldots+\text{Norm}((dir\_N)-(dirc\_N)))/N,$$

the norm of a vector v( )with three coordinates being given by Norm (v)=square root of (v1*v1+v2*v2+v3* v3)

According to one embodiment, the illumination light source is one of a point light source and a collimated light source.

According to one embodiment, the optical component is one of a concave optical component and a convex optical component.

According to one embodiment, the optical component is one of a mirror and a lens.

BRIEF DESCRIPTION OF THE DRAWINGS

In order to better illustrate the object of the present invention, a particular embodiment will be described here below, with reference to the accompanying drawings.

In these drawings.

DESCRIPTION OF THE PREFERRED EMBODIMENTS'

As a preamble to the description of the method of the present invention, the method that makes it possible to create an optical component, in order to generate a given illumination from a given light source on a far-field target (at infinity) will be described.

As previously indicated here above, this method, which corresponds to the method described in the published scientific paper "Light in power: A general and parameter free algorithm for caustic design", is not the only method that can be used and indeed it is possible for any analogous or equivalent method to be used in the context of the present invention, such that the invention therefore is not in any way limited to this particular method.

In order to illustrate the method, a plurality of various mirror or lens design problems that occur in non-imaging (anidolic) optics are presented. In all the problems, there is a given light source (either collimated or point source) and a desired illumination on a far-field target, subsequent to reflection or refraction. The goal is to design the geometry of a mirror or a lens that transports the energy emitted by the light source on to the target, with the multiple refractions and reflections not being taken into account. Even though the respective problems considered are different from each other, they share a common structure that corresponds to the equation referred to as generalized Monge-Ampére equation, of which the discrete version is given by Equation (1):

$$\forall i \in \{1, \ldots, n\} \int_{V_i(\psi)} p(x)dx = \sigma_i \quad (1)$$

The method is illustrated for lenses and mirrors, whether concave or convex, with point or collimated light sources.

1—Mirror Design 1.1—Convex Mirror for a Collimated Light Source

For this first problem, the light source is collimated: the light source may be encoded by a light intensity function p over a 2D domain. For the sake of simplicity, it is assumed that the domain is included in $R^2 \times \{0\} \subset R^3$ and that all the rays are parallel to the direction z (vertical) and directed in the upward direction. The desired target illumination is in the far field (at infinity) and is described by a set of intensity values $\sigma = (\sigma_i)_{1 \leq i \leq N}$ supported on a finite set of directions $Y = \{y_1, \ldots, y_n\}$ included in the unit sphere $S^2$. The problem is to find the surface R of a mirror that sends the source intensity p to the target intensity a. This problem corresponds to a Monge-Ampere equation in the 2D plane, which corresponds to a quadratic optimal transport problem.

Given that the number of reflected directions is finite, the mirror surface R is composed of a finite number of planar facets. $R_\psi$ is defined as the graph of a convex function of the form $x \to \max_i(x|p_i) - \psi_i$, where $(x|y)$ denotes the scalar product of x and y; for all $i \in (1, \ldots, N)$, $p_i$ is the orthogonal projection of a unit normal of the plane (referred to as slope in the sections that follow) that reflects according to Snell-Descartes law the vertical ray (0, 0, 1) towards the direction $y_i$, and $\psi_i$ is a real number that encodes the elevation of the support plane with the slope $p_i$.

$\psi := (\psi_i)_{1 \leq i \leq N}$ denotes the set of elevations. The Visibility cell op) of $y_i$ is defined as a set of localized points $x \in R^2 \times \{0\}$ whose rays are reflected towards the direction $y_i$, which means that the vertical rays hit the ith facet of $R_\psi$.

Given the definition of $R\psi$, it leads to the following:

$$V_i(P) = \{x \in R_2 \times \{0\} | \forall j, -(x|p_i) - (x|p_i) + \psi_j\}$$

By construction, the vertical ray emanating from the point $x \in V_i(\psi)$ touches the mirror surface at an altitude $(x|p_i) - \psi_i$ for a given i and is reflected towards the direction $y_i$, and as a consequence thereof the quantity of light reflected towards the direction $y_i$ is equal to the integral of p over $V_i(\psi)$. We also have $\nabla R_\psi(x) = p_i$ if $x \in V_i(\psi)$. The problem of the mirror with collimated light source then amounts to finding $(\psi_i)$ such that:

$$\forall i \in \{1, \ldots, n\} \int_{V_i(\psi)} p(x)dx = \sigma_i \quad (1)$$

By construction, a solution to Equation (1) provides a parameterization $R_\psi$, of a convex mirror, which sends the collimated light source to the discrete target a:

$$R_\psi : x \in R^2 \to (x, \max_i(x|p_i) - \psi_i) \text{ where } R^2 \times \{0\} \text{ and } R^2 \text{ are identified.}$$

It should be noted that since the mirror is a graph over $R^2 \times \{0\}$, the vectors $y_i$ cannot be directed in the upward direction (upward vertical). In practice, it is assumed that:

$$y_i \in S_-^2 := \{x \in S^2, (x|e_z) \leq 0\}.$$

In addition, the position of the mirror is localized by considering it only above the support:

$$X_p := \{x \in R^2 \times \{0\}, p(x) \neq 0\} \text{ of } p.$$

The same approach also allows for the construction of concave mirrors using a concave function of the form $x \to \min_i(x|p_i) + \psi_i$ This amounts to replacing the Visibility cells by:

$$V_i = \{x \in R^2 \times \{0\} | (x|p_i) + \psi_i \leq (x|p_j) + \psi_j \forall j\}$$

In this case, a solution to Equation (1) provides a parameterization of a concave mirror $R_\psi(x) = (x, \min_i(x|p_i) + \psi_i)$ that sends the collimated light source p to the discrete source a.

1.2—Concave Mirror for a Point Light Source

In this second design problem, all of the rays are emitted from a single point in space, situated at the origin, and the light source is described by a function of intensity p on the unit sphere $S^2$.

As in the previous case, the target is in the far field and is described by a set of values $\sigma = (\sigma_i)_{1 \leq i \leq N}$ supported on the finite set of directions $Y = \{y_1, \ldots, y_N\} \subset S^2$. The problem which is being considered is that of finding the surface of a mirror that sends the light intensity p to the light intensity o.

Thereafter a concave surface R is constructed which is made up of pieces of confocal paraboloids. More precisely, $P(y_i, \psi_i)$ is used to denote the solid paraboloid of which the focal point is at the origin with the focal length $\psi_i$ and with the direction $y_i$. The surface $R_\psi$ is defined as the boundary of the intersection of the solid paraboloids, that is to say, $R_\psi = \theta(\cap_i P(y_i, \psi_i))$. The Visibility cell $V_i(\psi)$ is the set of directions of rays $x \in S^2$ emanating from the light source that are reflected in the direction $y_i$. Given that each paraboloid $\xi P(y_i, \psi_i)$ is parameterized over the sphere by $x \to \psi_i x/(1-(x|y_i))$, it leads to:

$$V_i(\psi) = \left\{ x \in \mathbb{S}^2 \mid \forall j, \frac{\psi_i}{1 - \langle x \mid y_i \rangle} \leq \frac{\psi_j}{1 - \langle x \mid y_j \rangle} \right\}.$$

The point light source mirror problem then amounts to finding $(\psi_i)$ that satisfies the light energy conservation Equation (1). The mirror surface is then parameterized by:

$$R_\psi : x \in \mathbb{S}^2 \mapsto \min_i \frac{\psi_i}{1 - \langle x \mid y_i \rangle} x.$$

In practice, it is assumed that the target Y is included in $S^2$, that the support $X_p$ of p is included in $S_+^2 := \{x \in S^2, (x|e_z) \geq 0\}$ and that the mirror is parameterized over X.

The mirror surface may also be defined as the boundary of the union (instead of the intersection) of a family of solid paraboloids. The Visibility cell thus then becomes:

$$V_i(\psi) = \left\{ x \in \mathbb{S}^2 \mid \forall j, \frac{\psi_i}{1 - \langle x \mid y_i \rangle} \geq \frac{\psi_j}{1 - \langle x \mid y_j \rangle} \right\}$$

and a solution of Equation (1) provides a parameterization $R_\psi(x) = (x \max_i \psi_i/(1-(x|y_i)))$ of the surface of the mirror.

2. Lens Design

In this section, the goal is to design lenses that refract a given light source intensity to a desired target. In a manner similar to designing of a mirror, collimated or point light sources are considered.

In this instance $n_1$ is used to denote the refractive index of the lens, $n_2$ the refractive index of the ambient space, and $K = n_1/n_2$ denotes the ratio of the two indices.

Considered here is a collimated light source that is encoded by a function p on a 2D domain and a target illumination supported on a finite set:

$Y = \{y_1, \ldots, y_N\} \subset S^2$, encoded by $\sigma = (\sigma_i)_{1 \leq i \leq N}$.

The objective is to find the surface of a lens that sends p to a.

It is assumed that the rays emitted by the light source are vertical and that the base or bottom part of the lens is flat and orthogonal to the vertical axis. There is no angle of refraction when the rays enter the lens, and consequently it is thus only necessary to build the top part of the lens.

By means of a simple change of variables, it is shown that this problem is equivalent to that of designing a mirror for a collimated light source. More precisely, for every $y_i \varepsilon Y$, now $p_i$ is defined to be the slope of a plane that refracts the vertical ray (0, 0, 1) to the direction $y_i$. As well, R is defined as the graph of a convex function of the form $x \to \max_i(x|p_i) p_i$, where $\psi = (\psi_i)_{1 \leq i \leq N}$ is the set of elevations. The Visibility cell $V_i(\psi)$ is defined as being the set of points $x \in R^2 \times \{0\}$ that are refracted to the direction $y_i$:

$V_i(\psi) = \{x \in R^2 \times \{0\} \mid \forall j, -(x|p_i) + \psi_i \leq -(x|p_j) + \psi_j\}$ The collimated light source lens design problem thus then amounts to finding the weights $\psi = (\psi_i)_{1 \leq i \leq N}$ that satisfy the Equation (1). In this case, the lens surface is then parameterized by:

$R_\psi : x \in R^2 \to (x, \max_i(x|P_i) - \psi_i)$

In practice, it is necessary to choose the directions $y_i$ in $S_+^2$ and the mirror to be parameterized over the support $X_p$ of p.

It should be noted that it is also possible to construct concave lenses by taking into consideration the parameterizations with convex functions of the form $x \to \min_i (x|p_i) + \psi_i$.

2.2 Convex Lens for a Point Light Source

The same problem is considered, except that the collimated light source is replaced by a point light source. As in the configuration of the collimated light source, the base or bottom part of the lens is fixed. A piece of sphere centered at the source is chosen, such that the rays are not deviated. The lens is composed of pieces of ellipsoids of constant eccentricities K>1, where K is the ratio of indices of refraction. Each ellipsoid $\xi E(y_i, \psi_i)$ can be parameterized over the sphere by $x \to \psi_i x/(1-K(x|y_i))$ The Visibility cell is then:

$$V_i(\psi) = \left\{ x \in \mathbb{S}^2 \mid \forall j, \frac{\psi_i}{1 - K\langle x \mid y_i \rangle} \leq \frac{\psi_j}{1 - K\langle x \mid y_j \rangle} \right\}$$

The point light source lens problem thus then amounts to finding the weights $(\psi_i)_{1 \leq i \leq N}$ that satisfy the Equation (1).

The top surface of the lens is then parameterized by:

$$R_\psi : x \in \mathbb{S}^2 \mapsto \min_i \frac{\psi_i}{1 - K\langle x \mid y_i \rangle} x.$$

In practice, it is necessary to choose the set of directions $y_i$ so as to belong to $S_+^2$ and the lens to be parameterized over the support $X_p \subset S_+^2$ of p.

It is also possible to choose to define the lens surface as the boundary of the union (instead of the intersection) of a family of solid ellipsoids. In this case, the Visibility cells are given by:

$$V_i(\psi) = \left\{ x \in \mathbb{S}^2 \mid \forall j, \frac{\psi_i}{1 - K\langle x \mid y_i \rangle} \geq \frac{\psi_j}{1 - K\langle x \mid y_j \rangle} \right\}$$

and a solution to the Equation (1) provides a parameterization $R_\psi(x) = x \max_i \psi_i/(1-K(x|y_i))$ of the lens surface.

3. General Formulation

Let X be a domain either of the plane $R^2 \times \{0\}$, or of the unit sphere $S^2$; p: $X \to R$ a probability density; and $Y = \{y_1, \ldots, y_N\} \subset S^2$ a set of N points. The function G: $R^N \to R^N$ is defined by:

$G_i(\psi) = \int_{V_i(\psi)} p(x) dx$

Where $G(\psi) = (G_i(\psi))_{1 \leq i \leq N}$ and $V_i(\psi) \subset X$ is the Visibility cell of $y_i$, whose definition depends on the non-imaging problem. The use of this notation enables the reformulating of Equation (1) so as to find the weights $\psi=(\psi_i)_{1\le i\le N}$ such that:

$$\forall_i \in \{1, \ldots, N\}, G_i(\psi) = \sigma_i \quad (2)$$

4. Visibility and Power Cells

It is therefore necessary to compute the Visibility cells $V_i(\psi)$ associated with each optical modelling. The Visibility cells always have the same structure, making it possible to build a generic algorithm, as detailed here below. In all of the non-imaging optics problems, the Visibility cells are of the following form:

$$V_i(\psi) = Pow_i(P) \cap X \quad (3)$$

For a collimated light source, X denotes the plane $R^2 \times \{0\}$ and for a point light source, X is the unit sphere $S^2$. The sets $Pow_i(P)$ are the usual Power cells of a weighted point cloud $P = \{(p_i, \omega_i)\} \subset R^3 \times R$:

$$Pow_i(P) := \{x \in R^3 | \forall j, \|x-p_i\|^2 + \omega_i \le \|x-p_j\|^2 + \omega_j\}.$$

The expression of the weighted point cloud $P=\{(p_i, \omega_i)\}$ depends on the problem. The deduction of the expression for $p_i$ and $\omega_i$ in the collimated light source mirror case is explained, with the other formulas being set out in Table 1 for the other cases. In the collimated light source mirror case, the light source is collimated and $p_i \in R^2 \times \{0\}$ is the slope of the plane that reflects (according to Snell-Descartes law) the vertical ray upwards $e_z:=(0, 0, 1)$ towards the direction $y_i$. A calculation shows that $p_i = P_{R^2}(y_i - e_z)/(y_i|e_z|e_z)$, where $P_{R^2}$ denotes the orthogonal projection onto $R^2 \times \{0\}$.

The Visibility cell of $y_i$ is then given by:

$$V_i(\psi) = \{x \in R^2 \times \{0\} | \forall_j, -\langle x|p_i\rangle + \psi_i \le -\langle x|p_j\rangle \psi_j\}$$

$$= Pow_i(P) \cap (\mathbb{R}^2 \times \{0\}),$$

where $\omega_i = 2\psi_i - \|p_i\|^2$.

It may thus be concluded therefrom that the Visibility cells for a convex mirror of the point light source mirror problem are given by the Equation (3), in which the weighted point cloud is given by the first row of Table 1, which gives the formulas for the weighted points used to define the Power cells in the Equation (3) for various different non-imaging optics problems. In the lens design problem, $K>0$ is the ratio of the indices of refraction, $K>1$ in the point source and lens configuration. Ccv signifies concave, Cvx signifies convex, $\widetilde{Ccv}$ signifies that the optical component converges to a concave component when the discretization tends to infinity, CS signifies collimated light source, PS point light source:

TABLE 1

| Type | Points | Weights | |
|---|---|---|---|
| Cvx (CS/miroir) | $p_i = \dfrac{P_{\mathbb{R}^2}(y_i - e_z)}{\langle y_i - e_z\|e_z\rangle}$ | $\omega_i = 2\psi_i - \|p_i\|^2$ | |
| Ccv (Cs/miroir) | $p_i = -\dfrac{P_{\mathbb{R}^2}(y_i - e_z)}{\langle y_i - e_z\|e_z\rangle}$ | $\omega_i = 2\psi_i - \|p_i\|^2$ | |
| Cvx (PS/miroir) | $p_i = -\dfrac{y_i}{2\ln(\psi_i)}$ | $\omega_i = -\dfrac{1}{\ln(\psi_i)} - \dfrac{1}{4\ln(\psi_i)^2}$ | |
| $\widetilde{Ccv}$ (PS/miroir) | $p_i = \dfrac{y_i}{2\ln(\psi_i)}$ | $\omega_i = \dfrac{1}{\ln(\psi_i)} - \dfrac{1}{4\ln(\psi_i)^2}$ | |
| Cvx (CS/lentille) | $p_i = -\dfrac{P_{\mathbb{R}^2}(y_i - \kappa e_z)}{\langle y_i - \kappa e_z\|e_z\rangle}$ | $\omega_i = 2\psi_i - \|p_i\|^2$ | |
| Ccv (Cs/lentille) | $p_i = \dfrac{P_{\mathbb{R}^2}(y_i - \kappa e_z)}{\langle y_i - \kappa e_z\|e_z\rangle}$ | $\omega_i = 2\psi_i - \|p_i\|^2$ | |
| Cvx (PS/lentille) | $p_i = -\kappa\dfrac{y_i}{2\ln(\psi_i)}$ | $\omega_i = -\dfrac{1}{\ln(\psi_i)} - \dfrac{\kappa^2}{4\ln(\psi_i)^2}$ | |
| $\widetilde{Ccv}$ (PS/lentille) | $p_i = \kappa\dfrac{y_i}{2\ln(\psi_i)}$ | $\omega_i = \dfrac{1}{\ln(\psi_i)} - \dfrac{\kappa^2}{4\ln(\psi_i)^2}$ | |

5. Generic Algorithm

For each optical design problem, given a light source intensity function, a target light intensity function and an error parameter, Algorithm 1 (here below) provides a triangulation of a mirror or a lens that satisfies the light energy conservation Equation (1).

The main problem is to find weights $\psi$ such that $G(\psi)=a$. This is achieved by using a damped Newton algorithm which has a quadratic local convergence rate for optimal transport problems or for Monge-Ampere equations in the plane.

The algorithm comprises three steps:

Initialization: the source density is discretized into a piecewise affine density and the target one into a finitely supported measure. This is then followed by constructing the initial weights $\psi^0$ satisfying the condition $V_i, G_i(\psi^{(0)}) > 0$.

Damped Newton: a sequence $\psi^k$ is constructed following Algorithm 2 until $$\|G(\psi^k - \sigma)\|_\infty \le \eta.$$

Surface Construction: finally the solution $\psi^k \in R^N$ is converted into a triangulation. Depending on the non-imaging optics problem, this amounts to approximating a union (or an intersection) of half-spaces (or solid paraboloids, or ellipsoids) by a triangulation.

Initialization:

Discretization of Light Intensity Functions: The framework of the method makes it possible to support any type of collimated or point light source, or target light intensity functions. It may be for example a positive function on the plane or the sphere (depending on the problem) or a greyscale image, which is seen as a piecewise affine function. First the support of the source density p is approached by a triangulation T and it is assumed that the density p : T→R$^+$ is affine on each triangle. Then p is normalized by dividing it by the total integral $\int_T p(x)dx$.

In a similar manner, the target light intensity function can also be any discrete probability measure. If the user provides an image, it can be transformed into a discrete measure on the form $\sigma = \Sigma_i \sigma_i \delta_{y_i}$ by making use of Lloyd's algorithm or more simply, by taking one Dirac measure per pixel, the latter approach being adopted in this instance. The target measure is also normalized by dividing by the discrete integral $\sigma = \Sigma_i \sigma_i$. Furthermore, $\min_i \sigma_i > 0$ is needed for the damped Newton algorithm, however this is not a restriction: if $\sigma_i = 0$, this simply leads to removal of the corresponding Dirac measure $\delta_{y_i}$, thus ensuring that no light is sent to $y_i$.

Selection of the Initial Family of Weights T0: As previously mentioned here above, it is necessary to ensure that at each iteration all Visibility cells have non-empty interiors. In particular, it is necessary to choose a set of initial weights $\psi^0=(\psi_i^0)_{1\leq i\leq N}$ such that the initial Visibility cells are not empty.

For the collimated light sources cases (with mirror or lens), it is noted that if $\psi_i^0=\|p_i\|^2/2$ is chosen, then $\omega_i=0$, where $p_i$ is obtained by using the formulas of Section 4 (Visibility and Power Cells). The Visibility diagram then becomes a Voronoi diagram, and consequently $p_i \in V_i(\psi^0)$.

For the point light source mirror case, a calculation shows that if one were to choose $\psi_i^0=1$, then $-y_i \in V_i(\psi^0)$.

For the point light source lens case, it can be shown that if one were to also choose $\psi_i^0=1$, then $y_i \in V_i(\psi^0)$.

It should be noted that the previous expressions for $\psi^0$ ensure that $G_i(\psi^0)=p(V_i(\psi^0))>0$ only when the support $X_p$ of the light source is sufficiently large. By way of example in the case of a point source mirror, if $y_i \in X_p$, then $G_i(\psi^0)=0$ may be obtained. In order to deal with this difficulty, use is made of a linear interpolation between p and a constant density supported on a set that contains the $(-y_i)$'s. This strategy also works for the collimated source lens case, the point source lens and collimated source lens cases.

Damped Newton Algorithm: When the light source is collimated (that is $X=R^2\times\{0\}$), the problem is known to be an optimal transport problem in the plane for the quadratic cost, the function G is the gradient of a concave function, its Jacobian matrix DG is symmetric and $DG\leq 0$. Moreover, if $G_i(\psi)>0$ for all i and if $X_p$ is connected, then the kernel of DG spans over $\psi$=cst. This ensures the convergence of the damped Newton algorithm presented in algorithm 2 here below, where $A^+$ denotes the pseudo-inverse of the matrix A. In practice, taking the pseudo-inverse matrix of $D\tilde{G}(\tilde{\psi}^k)$ ensures that the mean of the $\tilde{\psi}^k$ remains constant. Still in practice, one row and one column are removed from the matrix in order to make it full rank.

When the light source is a point source, a change is effected in respect of the variables $\tilde{\psi}=\ln(\psi)$ and $\tilde{G}=G \circ \exp$, such that $G(\psi)=\sigma$. This change in variable transforms the optical component design problem into an optimal transport problem, ensuring that G is the gradient of a concave function and that D$\tilde{G}$ is symmetric negative, and therefore easily invertible. In the point light source mirror problem with convex mirrors, the damped Newton algorithm has been proven to be converging.

Computation of G and DG: According to Section 4, the Visibility cells $V_i(\psi)$ may be computed by the intersecting of a certain 3D power diagram with a triangulation T of the support $X_p$ of p. Such an intersection may for example be computed by the algorithm described in "A numerical algorithm for $L^2$ semi-discrete optimal transport in 3D", Bruno Levy, arXiv preprint arXiv: 1409.1279 (2014). Then $G_i(\psi)=\int_{V_i(\psi)} p(x)dx$ may be computed by using first order quadrature formulas. The computation of DG is done by using forward-mode automatic differentiation, where the gradient of $G_i(\psi)$ is stored as a sparse vector. It should be noted that this works quite efficiently since all the numbers that occur in the computation of $G_i(p)$ depend only on the values of $\psi_j$ where j is such that (i, j) are neighbours in the Visibility diagram, i.e. $V_i(\psi) \cap V_j(\psi) \neq \emptyset$.

Linear system: Given that Da is sparse and symmetric negative, the solving of the linear systems is done using the preconditioned conjugate gradient.

Surface construction: In the last step of Algorithm 1, a triangulation of the mirror or lens surface is constructed. The input is a family of weights solving Equation (2) and the parameterization function $R_\psi$ whose formula is given here above and depends on the different cases. Each Visibility cell is triangulated by taking the convex envelope of the vertices of its boundary. A vertex of the triangulation will belong to at least one Visibility cell. For each vertex, it is possible to compute exactly the normal to the continuous surface using the Snell-Descartes law since the incident ray and the corresponding reflected/refracted direction $y_i$ are known.

Algorithms 1 and 2 are described here below:

---

Algorithm 1: Mirror/Lens Construction

Input:   A light source intensity function $\rho_{in}$
         A target light intensity function $\sigma_{in}$
         A tolerance $\eta$
Output:  A triangulation $R_T$ of a mirror or a lens
Step 1: Initialization
         T, $\rho$ ← DISCRETISATION_SOURCE ($\rho_{in}$)
         Y, $\sigma$ ← DISCRETISATION_TARGET ($\sigma_{in}$)
         $\psi^0$ ← INITIAL_VECTORS (Y)
Step 2: Solve Equation (2): $G(\psi) = \sigma$
         $\psi$ ← DAMPED_NEWTON (T, $\rho$, Y, $\sigma$, $\psi^0$, $\eta$)
Step 3: Construct a triangulation $R_T$ of R
         $R_T$ ← SURFACE_CONSTRUCTION ($\psi$, $R_\psi$)

---

Algorithm 2: Damped Newton Method for $G(\psi) = \sigma$

Input: The source $\rho$ : T ↦ $\mathbb{R}^+$ and a target $\sigma = \Sigma_i \sigma_i \delta_{y_i}$; an initial vector $\psi^0$ and a tolerance $\eta > 0$.
Step 1: Transformation to an Optimal Transport Problem
IF X = $\mathbb{R}^2 \times \{0\}$ then $\tilde{\psi}^0 = \psi^0$ (et $\tilde{G} = G$)
IF X = $\mathbb{S}^2$, then $\tilde{\psi}^0 = (\ln(\psi_i^0))_{1\leq i\leq N}$ (and $\tilde{G} = (G_i \cdot \exp)_{1\leq i\leq N}$)
Step 2: Solve the equation $\tilde{G}(\tilde{\psi}) = \sigma$
Initialization: $\varepsilon_0 := [\min_i \tilde{G}_i(\tilde{\psi}^0), \min_i \sigma_i] > 0$, k := 0
While $\|\tilde{G}(\tilde{\psi}^k) - \sigma\|_\infty \geq \eta$
- Compute $d_k = -D\tilde{G}(\tilde{\psi}^k)^+ (\tilde{G}(\tilde{\psi}^k) - \sigma)$
- Find the smallest $\ell \in \mathbb{N}$ provided that $\tilde{\psi}^{k,\ell} := \tilde{\psi}^k + 2^{-\ell}d_k$ satisfies:

$$\begin{cases} \min_i \tilde{G}_i(\tilde{\psi}^{k,\ell}) \geq \varepsilon_0 \\ \|\tilde{G}(\tilde{\psi}^{k,\ell}) - \sigma\|_\infty \geq (1 - 2^{-(\ell+1)})\|\tilde{G}_{\tilde{\psi}^k} - \sigma\|_\infty \end{cases}$$

- Set $\tilde{\psi}^{k+1} = \tilde{\psi}^k + 2^{-\ell}d_k$ and k ← k + 1
Return $\psi := (\tilde{\psi}_i^k)_{1\leq i\leq N}$ si X = $\mathbb{R}^2 \times \{0\}$ or
$\psi := (\exp(\tilde{\psi}_i^k))_{1\leq i\leq N}$ si X = $\mathbb{S}^2$

---

Although this value is given only by way of an example, in practice, it is possible to choose $\eta = 10^{-8}$.

The foregoing sections therefore serve to explain one of the methods for solving far-field non-imaging (anidolic) optics problems, that is to say, constructing a lens or a mirror, whether concave or convex, from a given source of light, which is either a collimated or point source, in order to achieve a given illumination on a target at infinity.

Although this is not the only method that it is possible to use in the context of the invention, the method described here above can be used in the context of the step (d) of the method of the invention described here below.

The problem solved in the far field by the above method can also be solved in the near field.

Figure 1:
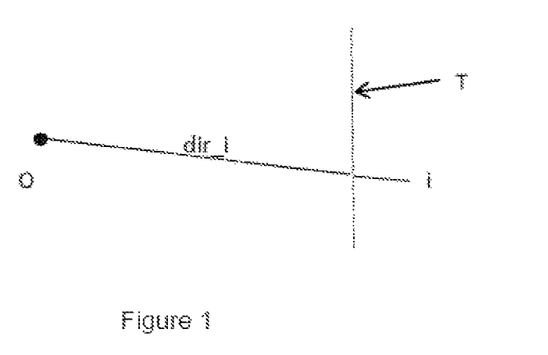
FIG. 1 is a diagram illustrating a step of the method according to the invention.
Figure 2:
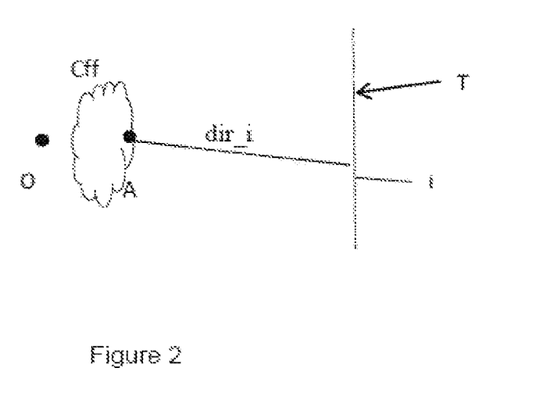
FIG. 2 is a diagram illustrating another step of the method according to the invention.
Figure 3:
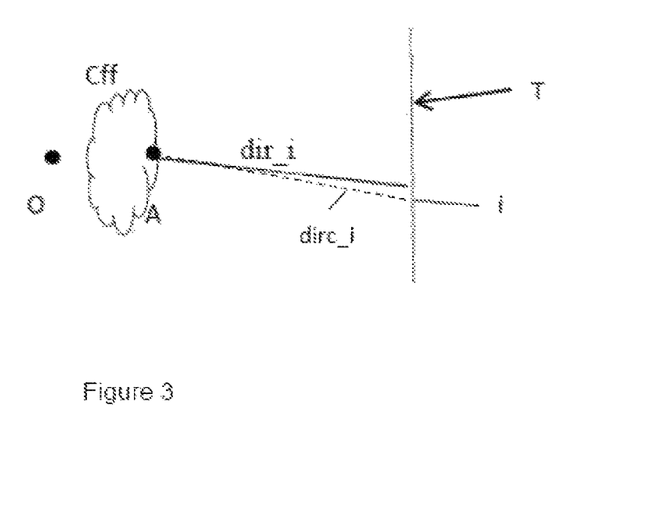
FIG. 3 is a diagram illustrating yet another step of the method according to the invention.

The method of the invention for solving the near-field problem is detailed here below, in conjunction with FIGS. 1-3.

In the method according to the invention, there is an illumination target T and an illumination light source S, the illumination target T being in the near field and therefore at a finite distance from the illumination light source S.

From this illumination light source S, it is sought to obtain a given illumination on the target T, by incidence of the light coming from the illumination light source S on an optical component Cnf to be designed.

The illumination on the target T is characterized by a quantity of light received alpha_i at any point i of the target T.

According to the method, the following steps are carried out:
- (a) positioning an origin point 0 between the illumination light source S and the illumination target T;
- (b) for each point i of the illumination target T, computing a direction dir_i which corresponds to the direction of the vector connecting the origin point 0 and the point i on the illumination target T (FIG. 1);
- (c) positioning a reference point A between the origin point 0 and the illumination target T;
- (d) creating the optical component Cff whose surface passes through the reference point A and which, when the illumination originating from an illumination light source S is incident on the optical component Cff, generates an illumination comprised of all the illuminations of direction dir_i and quantity of light alpha_i (FIG. 2);
- (e) for each point z_i of the optical component Cff that generates the directional illumination dir_i and quantity of light alpha_i, computing a corrected direction dirc_i which corresponds to the direction of the vector connecting the point z_i and the point i on the illumination target T (FIG. 3);
- (f) determining whether or not, for each point i, the difference between the direction dir_i and the corrected direction dirc_i satisfies a predetermined criterion;
- (g) if, for each point i, the difference between the direction dir_i and the corrected direction dirc_i satisfies the predetermined criterion, creating the optical component C that corresponds to the optical component Cff;
- (h) if, for each point i, the difference between the direction dir_i and the corrected direction dirc_i does not satisfy the predetermined criterion, reiterating the steps (d) to (f) by substituting dir_i with dirc_i.

The method of the invention here above is applicable to any non-imaging (anidolic) optics problem, in particular for a fabricated optical component that is a concave or convex mirror or a lens.

The optical component created in the step (g) is created according to the conventional means for creating an optical component, whether this be a mirror or a lens, for example by milling on a 3-axis numerical control (CNC) machine tool after prior milling of the blank, this being preferably computer assisted or computer controlled so as to improve the finish of the optical component thus produced, optionally followed by sanding and/or polishing. For a lens, it is possible to use, for example, though not exclusively, poly (methyl methacrylate) (PMMA), while for a mirror, aluminum may be used.

The method of the invention may be translated into algorithmic form as in the Algorithm 3 here below, in order to provide for a better understanding thereof and possibly an automated implementation of the same, in a manner analogous to the method set out in the preamble to the detailed description for a far field target.

The method described here above, with a target illumination a $\Sigma_{i=1}^{N} \sigma_i \delta_{z_i}$ supported on a set of points $Z=\{z_1, \ldots, z_N\} \subset \mathbb{R}^3$, is, as indicated in the method, tantamount to iteratively solving a far-field problem, namely Equation (1), which rapidly converges to the near field solution.

In the Algorithm 3, SOLVE_FF (T, p, $Y^k$, σ, η) denotes an algorithm that solves the far field problem between a source p: $T \mapsto \mathbb{R}^+$ and a target $\sigma = \Sigma_i \sigma_i \delta_{y_i}$ supported on $Y \subset S^2$ for a numerical error η. The Step 2 of Algorithm 1 may for example be implemented in order to solve this problem.

---

Algorithm 3: Optical Component Design for a Near-Field Target

Input: The source $\rho : T \mapsto \mathbb{R}^+$ and a target $\sigma = \Sigma_{i=1}^{N} \sigma_i \delta_{z_i}$ ;
an initial vector $\psi^0$ and two
tolerances η, $\eta_{NF}$ > 0.
Initialization: $\forall i, c_i^0 = 0$
  While $\|c^{k+1} - c^k\|_1/N > \eta_{NF}$
    Compute $v_i^k = R_\psi k(c_i^k)$
    Set $y_i^k = (z_i - v_i^k)/\|z_i - v_i^k\|$
    Solve $\psi^{k+1} \leftarrow$ SOLVE_FF (T, ρ, $Y^k$, σ, η)
    Update $c^{k+1}$ to be the barycenter of $V_i(\psi^{k+1})$.

---

It is clear that when a fixed point is reached in Algorithm 3, which corresponds algorithmically to the method of the invention, the corresponding weight vector p is a near-field solution.

The Applicant has observed in practice that the process converges very quickly. Over several attempts, an error $\eta_{NF}$ of less than $10^{-6}$ was obtained after only 6 iterations.

Figure 4:
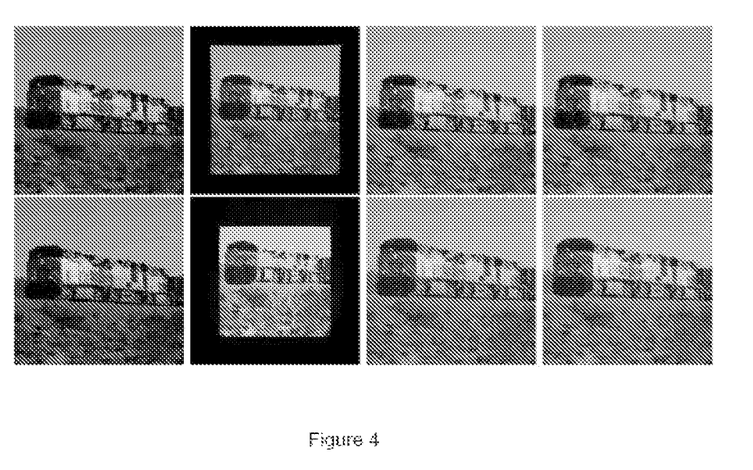
FIG. 4 is a simulation of different iterations of the method of the invention, for a concave lens and a convex mirror.

The convergence of the method of the invention is illustrated in FIG. 4, which represents, on the example of the image of the train on the first line, a rendering of the target image, the first iteration, the second iteration and the sixth iteration, for a collimated source concave lens configuration; while the second line represents a rendering of the target image, the first iteration, the second iteration and the sixth iteration, for a collimated source convex mirror configuration. It can therefore be observed that after six iterations, the image is almost identical to the target image.

The method according to the invention may be applied to any non-imaging optics problem, regardless of whether the light source is a point or collimated source, whether the optical component is a mirror or a lens, whether the geometry of the optical component is concave or convex. The method of the invention works equally well even if the light source is not uniform.

The invention claimed is:
1. A method for fabricating an optical component that generates on a near field illumination target a determined illumination pattern according to which each point (i) of the illumination target receives a quantity of light (alpha i) via an illumination originating from an illumination light source and incident on the optical component which is located between the illumination light source and the illumination target, wherein the method comprising the following steps:
   (a) for each point (i) of the illumination target, computing a direction (dir i) of a vector connecting an origin point (o) and the point (i) of the illumination target, the original point (o) being between the illumination light source and the illumination target;
   (b) defining a surface of the optical component such that said surface passes through a reference point (A) positioned between the origin point (0) and the illumination target and so that, when the illumination originating from the illumination light source is incident on the optical component, the optical component generates an output illumination comprised of the quantity of light (alpha_i) of all the points (i) of the illumination target, points (z_i) of the optical component each respectively generating a correspondent output illumination to a correspondent point (i) of the illumination target comprised of a respective quantity of light (alpha_i)

received by the point (i) and a respective direction (dir_i) connecting to the point (i);
(c) for each point (z_i) of the optical component, computing a corrected direction (dirc_i) which corresponds to a direction of a vector connecting the point (z_i) and a respective point (i) of the illumination target;
(d) determining whether or not a criterion is satisfied, whereby the mean of a sum of norms of differences between the direction (dir_i) and the corrected direction (dirc_i) of all the points (i) of the illumination target is less than a predetermined value;
(e) fabricating the optical component when the criterion is satisfied; and
(f) if the criterion is not satisfied, setting the direction (dir_i) to have the value of the corrected direction (dirc_i) and repeating from step (b) until the criterion is satisfied.

2. The method according to claim 1, wherein the optical component is one of a concave optical component and a convex optical component.

3. The method according to claim 1, wherein the optical component is one of a mirror and a lens.

4. The method according to claim 2, wherein the optical component is one of a mirror and a lens.

* * * * *